US011865840B2

(12) United States Patent
Inui et al.

(10) Patent No.: US 11,865,840 B2
(45) Date of Patent: Jan. 9, 2024

(54) RECORDING HEAD AND INKJET RECORDING APPARATUS

(71) Applicant: KYOCERA Document Solutions Inc., Osaka (JP)

(72) Inventors: Yasutaka Inui, Osaka (JP); Naoto Miyakoshi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 20 days.

(21) Appl. No.: 17/705,103

(22) Filed: Mar. 25, 2022

(65) Prior Publication Data

US 2022/0332111 A1 Oct. 20, 2022

(30) Foreign Application Priority Data

Apr. 15, 2021 (JP) ................................ 2021-068752

(51) Int. Cl.
*B41J 2/14* (2006.01)

(52) U.S. Cl.
CPC .................................. *B41J 2/1433* (2013.01)

(58) Field of Classification Search
CPC ........ B41J 2/1433; B41J 2/14; B41J 2/14008; B41J 2/14024; B41J 2/14201; B41J 2/16517; B41J 2002/16502; B41J 2/055; B41J 2/135; B41J 2/1623
See application file for complete search history.

(56) References Cited

U.S. PATENT DOCUMENTS

2003/0132992 A1* 7/2003 Hiwatashi .............. B41J 2/1629 347/71
2004/0201644 A1* 10/2004 Van Den Berg ......... B41J 2/055 347/46
2021/0060952 A1 3/2021 Sato et al.

FOREIGN PATENT DOCUMENTS

CN 111511560 A 8/2020
JP 2016-124111 A 7/2016

OTHER PUBLICATIONS

Chinese Office Action dated Jun. 3, 2023, issued by the China National Intellectual Property Administration in corresponding application CN 202210343823.9.

* cited by examiner

*Primary Examiner* — Jason S Uhlenhake
(74) *Attorney, Agent, or Firm* — Stein IP, LLC

(57) ABSTRACT

A recording head includes an ink ejection portion and an ink holding portion. The ink holding portion includes a sheet portion and a holding portion. The sheet portion has an upper end side fixed to the ink ejection portion and a lower end side movable in a direction of coming closer to or separating away from a side surface of the ink ejection portion. The holding portion is located at a lower end portion of the sheet portion on the ink ejection portion side, is disposed to come into contact with or close to the side surface of the ink ejection portion, and is configured to hold an ink in an adjacent region with respect to the ink ejection portion.

8 Claims, 4 Drawing Sheets

RECORDING HEAD AND INKJET RECORDING APPARATUS

INCORPORATION BY REFERENCE

This application is based on and claims the benefit of priority from Japanese Patent Application No. 2021-068752 filed on Apr. 15, 2021, the contents of which are hereby incorporated by reference.

BACKGROUND

The present disclosure relates to a recording head and an inkjet recording apparatus.

An inkjet recording apparatus includes a recording head that ejects ink onto a recording medium such as a sheet to record an image on the sheet. In the inkjet recording apparatus, a technology for cleaning an ink ejection face of the recording head is proposed in order to prevent an ink ejection failure of the recording head.

Meanwhile, in the recording head, the ink has sometimes risen up on a side surface of the recording head due to the cleaning of the ink ejection face. The ink that has risen up on the side surface of the recording head dries and hardens. There has been a fear in that the ink may fall onto a sheet that passes below the recording head when an amount of the ink that has risen up increases.

For such a defect as described above, for example, in a recording head of a related-art inkjet recording apparatus, a first water repellent film in which a contact angle with respect to water is 90° or more is formed on an ink ejection face, and a second water repellent film in which a contact angle with respect to water is larger by 10° or more than that of the first water repellent film is formed on a side surface. Thus, it is possible to prevent adhesion of the ink to the side surface of the recording head.

SUMMARY

A recording head according to one aspect of the present disclosure includes an ink ejection portion and an ink holding portion. The ink ejection portion has a bottom surface including an ink ejection face configured to eject ink onto a recording medium, and at least one side surface connected to the bottom surface. The ink holding portion is disposed on the side surface and configured to hold ink with the side surface. The ink holding portion includes a sheet portion and a holding portion. The sheet portion has an upper end side fixed to the ink ejection portion and a lower end side movable in a direction of coming closer to or separating away from the side surface. The holding portion is located at a lower end portion of the sheet portion on the ink ejection portion side, is disposed to come into contact with or close to the side surface, and is configured to hold the ink in an adjacent region with respect to the ink ejection portion.

DETAILED DESCRIPTION

Description is now given on an embodiment of the present disclosure with reference to the drawings. Further, the present disclosure is not limited to what is described below.

Figure 1:
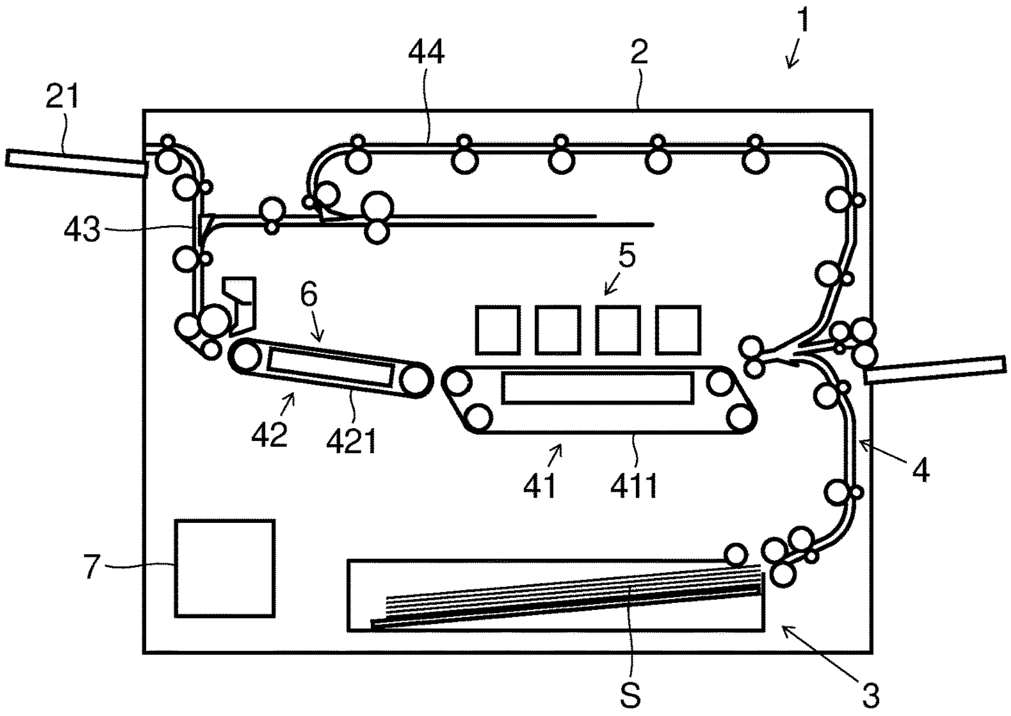
FIG. 1 is a schematic sectional front view of an inkjet recording apparatus according to one embodiment of the present disclosure.
Figure 2:
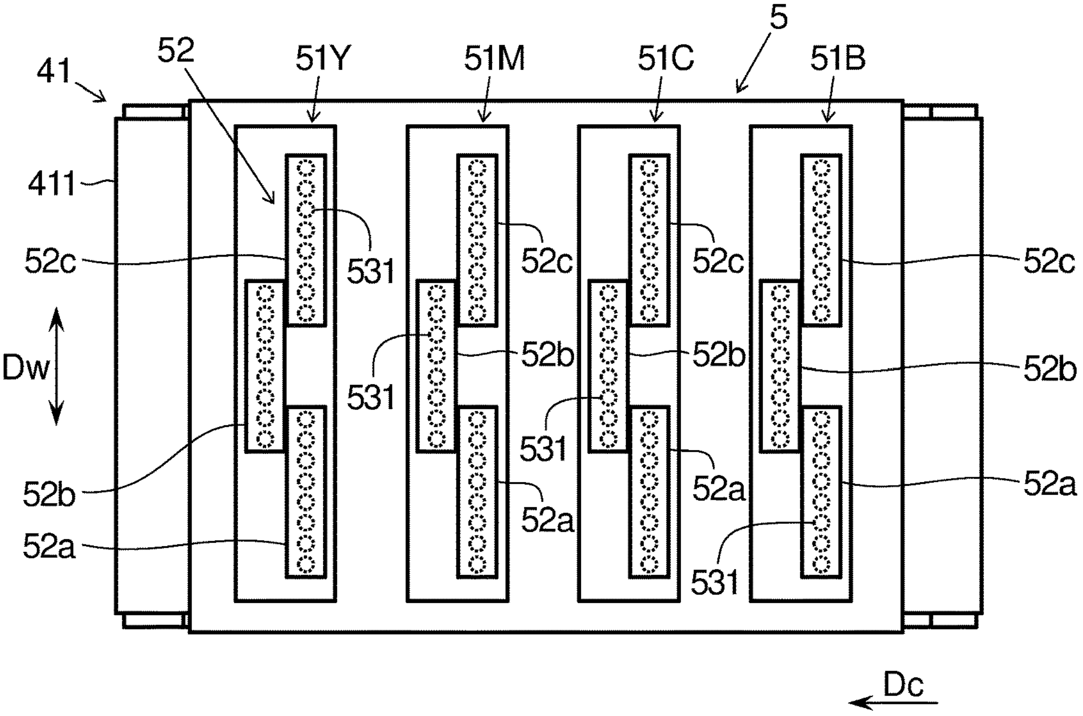
FIG. 2 is a top view of a recording unit of the inkjet recording apparatus of FIG. 1.

FIG. 1 is a schematic sectional front view of an inkjet recording apparatus 1 according to an embodiment. FIG. 2 is a top view of a recording unit 5 of the inkjet recording apparatus 1 of FIG. 1. The inkjet recording apparatus 1 is, for example, a printer of an inkjet-recording type. As illustrated in FIG. 1 and FIG. 2, the inkjet recording apparatus 1 includes an apparatus main body 2, a sheet supply unit 3, a sheet conveyance unit 4, a recording unit 5, a drying unit 6, and a control unit 7.

The sheet supply unit 3 houses a plurality of sheets (recording media) S, and separates and sends out the sheets S one by one at the time of recording. The sheet conveyance unit 4 conveys the sheet S, which has been sent out from the sheet supply unit 3, to the recording unit 5 and the drying unit 6, and further, delivers the sheet S, which has been subjected to the recording and the drying, to a sheet delivery unit 21. When duplex recording is to be performed, the sheet conveyance unit 4 distributes the sheet S, which has been subjected to recording and drying on a first surface thereof, to a reverse conveyance unit 44 by a branching unit 43. Further, the sheet conveyance unit 4 conveys the sheet S, which has been switched in a conveyance direction and reversed front and back, to the recording unit 5 and the drying unit 6 again.

The sheet conveyance unit 4 includes a first belt conveyor unit 41 and a second belt conveyor unit 42. The first belt conveyor unit 41 has a first conveyor belt 411 formed in an endless shape. The second belt conveyor unit 42 has a second conveyor belt 421 formed in an endless shape. The first belt conveyor unit 41 and the second belt conveyor unit 42 convey the sheet S while attracting and holding the sheet S on respective upper outer surfaces (upper surfaces) of the first conveyor belt 411 and the second conveyor belt 421. The first belt conveyor unit 41 is disposed below the recording unit 5, and conveys the sheet S. The second belt conveyor unit 42 is located downstream of the first belt conveyor unit 41 in a sheet conveyance direction, is disposed in the drying unit 6, and conveys the sheet S.

The recording unit 5 faces the sheet S conveyed while being attracted to and held on the upper surface of the first conveyor belt 411, and is disposed above the first conveyor belt 411 and apart by a predetermined distance. As illustrated in FIG. 2, the recording unit 5 holds head units 51B, 51C, 51M, and 51Y, which correspond to four colors of black, cyan, magenta, and yellow, respectively. The head units 51B, 51C, 51M, and 51Y are arrayed along a sheet conveyance direction Dc so that a longitudinal direction of each thereof becomes parallel to a sheet width direction Dw orthogonal to the sheet conveyance direction Dc. The four head units 51B, 51C, 51M, and 51Y have the same basic configuration. Accordingly, in the following description, identification symbols of "B", "C", "M", and "Y", which denote the respective colors, are sometimes omitted unless the four colors need to be particularly identified.

Each of the head units 51 for the respective colors includes recording heads 52 employing a line-type inkjet system. In each of the head units 51 for the respective colors, a plurality of (for example, three (52*a*, 52*b*, 52*c*)) recording heads 52 are arrayed in a staggered pattern along the sheet width direction Dw. That is, in this embodiment, a width direction of the recording head 52 (that is, a longitudinal direction of the recording head 52) and the sheet width direction Dw match each other. Thus, the width direction of the recording head 52 is sometimes described as the head width direction Dw.

The recording head 52 has a plurality of ink ejection nozzles 531 on a bottom thereof. The plurality of ink ejection nozzles 531 are arranged in line along the sheet width direction Dw, and can eject ink over the entire region of a recording region on the sheet S. That is, the recording head 52 has the plurality of ink ejection nozzles 531 which eject ink onto the sheet S. The recording unit 5 sequentially ejects ink from the recording heads 52 of the four-color head units 51B, 51C, 51M, and 51Y toward the sheet S conveyed by the first conveyor belt 411 to record a full color image or a monochrome image on the sheet S.

The drying unit 6 is disposed downstream of the recording unit 5 in the sheet conveyance direction, and is provided with the second belt conveyor unit 42. The sheet S having been subjected to recording of such an ink image by the recording unit 5 has the ink thereon dried while being attracted to and held on the second conveyor belt 421 in the drying unit 6.

The control unit 7 includes a CPU, a storage unit, and other electronic circuits and electronic components (all are not shown). Based on control programs and data stored in the storage unit, the CPU controls operations of the respective components, which are provided in the inkjet recording apparatus 1, to perform processing related to functions of the inkjet recording apparatus 1. The sheet supply unit 3, the sheet conveyance unit 4, the recording unit 5 and the drying unit 6 individually receive instructions from the control unit 7, and perform the recording onto the sheet S in conjunction with one another. The storage unit is formed of a combination of, for example, nonvolatile storage devices such as a program read-only memory (ROM) and a data ROM, and a volatile storage device such as a random access memory (RAM).

Figure 3:
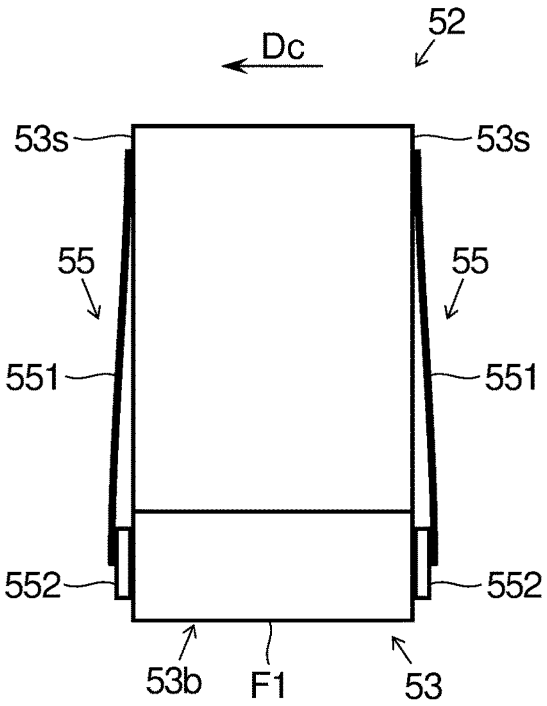
FIG. 3 is a schematic front view of a recording head of the recording unit of the inkjet recording apparatus according to a first embodiment of the present disclosure.
Figure 4:
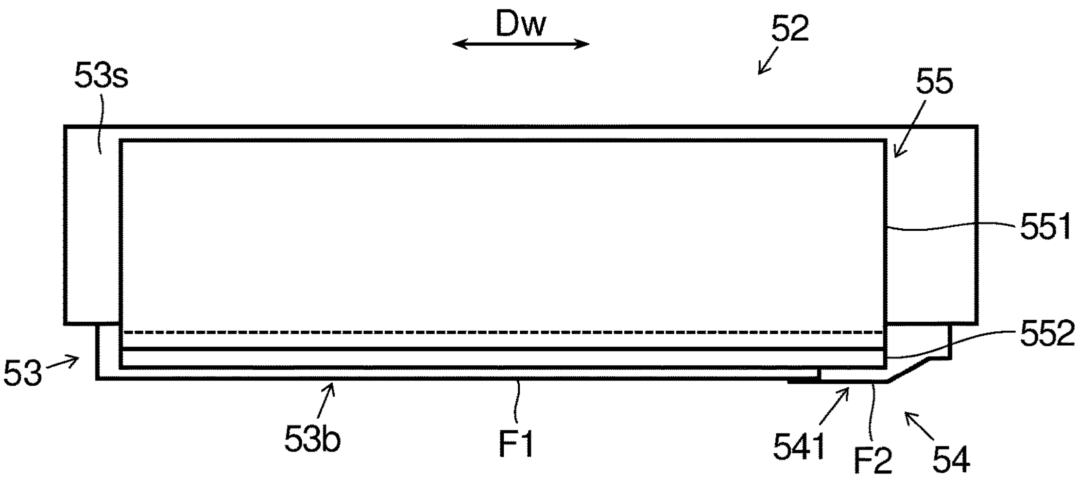
FIG. 4 is a schematic side view of the recording head of FIG. 3.
Figure 5:
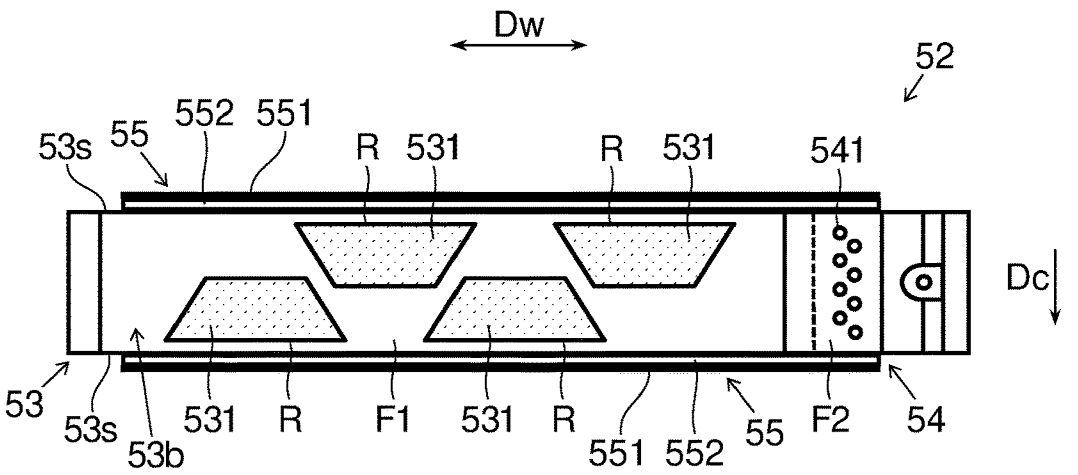
FIG. 5 is a schematic bottom view of the recording head of FIG. 3.

Next, a configuration of each of the recording heads 52 of the recording unit 5 is described with reference to FIG. 3, FIG. 4, and FIG. 5. FIG. 3, FIG. 4, and FIG. 5 are a schematic front view, a schematic side view, and a schematic bottom view of the recording head 52 of the recording unit 5 of the inkjet recording apparatus 1 according to a first embodiment. The three recording heads 52*a*, 52*b*, and 52*c* for each color have the same shape and the same configuration. Thus, in the following description, identification symbols (a, b, c) are omitted.

The recording head 52 includes an ink ejection portion 53, a cleaning liquid supply portion 54, and ink holding portions 55.

The ink ejection portion 53 has a bottom surface 53*b* and side surfaces 53*s*. The bottom surface 53*b* includes an ink ejection face F1 that ejects ink onto the sheet S. The side surfaces 53*s* connect to the bottom surface 53*b*, and face the side of the recording head 52. In this embodiment, the ink ejection portion 53 has two side surfaces 53*s* which extend in an up-and-down direction in parallel to the head width direction Dw. One of the two side surfaces 53*s* faces an upstream side in the sheet conveyance direction Dc, and another one of the two side surfaces 53*s* faces a downstream side in the sheet conveyance direction Dc.

The ink ejection face F1 faces a front surface of the sheet S conveyed on the first conveyor belt 411. As illustrated in FIG. 5, the ink ejection face F1 has nozzle regions R in which a large number of ink ejection nozzles 531 are arrayed. That is, the large number of ink ejection nozzles 531 are open on the ink ejection face F1, and eject ink onto the sheet S. A water repellent film (not shown) is formed on the ink ejection face F1. The ink ejection portions 53 for the four colors (black, cyan, magenta, and yellow) are individually supplied with the inks of four colors stored in ink tanks (ink supply sources) placed outside the head units 51.

Based on a control signal from the control unit 7, the ink ejection portion 53 ejects ink from the ink ejection nozzles 531 toward the sheet S, which is conveyed while being attracted to and held on a conveyance surface of the first conveyor belt 411, according to image data received from an external computer. In this manner, the color image formed by superimposing the inks of four colors including black, cyan, magenta, and yellow are superimposed on one another, or the monochrome image is formed on the sheet S on the first conveyor belt 411.

The cleaning liquid supply portion 54 is provided at a lower portion of the ink ejection portion 53 on one end side in the head width direction Dw. The cleaning liquid supply portion 54 has a cleaning liquid supply face F2 on a lower surface thereof. The cleaning liquid supply face F2 is parallel to the ink ejection face F1, and is adjacent to the ink ejection face F1 along the head width direction Dw. A water repellent film (not shown) is formed on the cleaning liquid supply face F2. A large number of cleaning liquid supply ports 541 are open on the cleaning liquid supply face F2. The large number of cleaning liquid supply ports 541 are arrayed, for example, in a staggered pattern along the sheet conveyance direction Dc.

Figure 6:
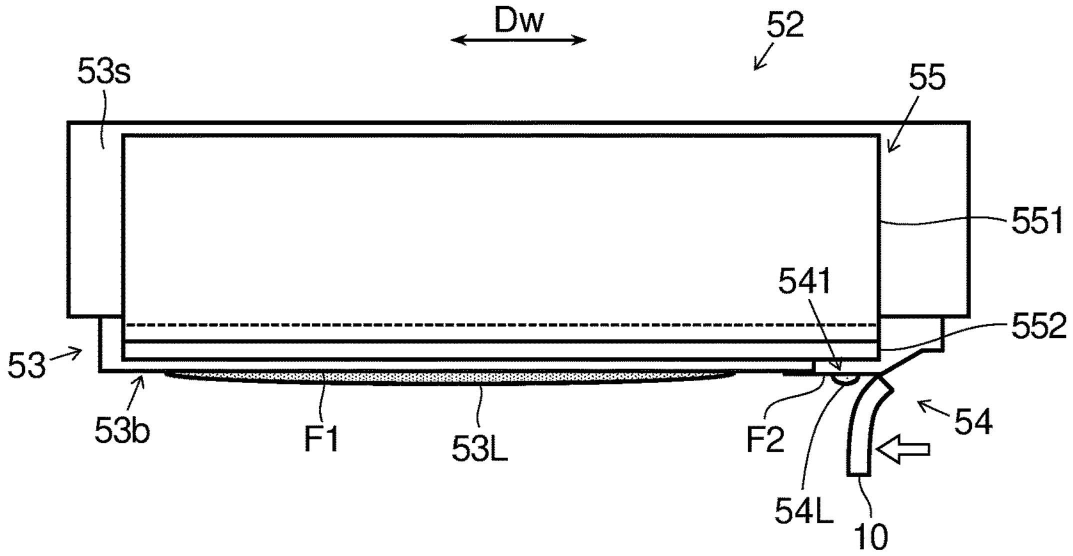
FIG. 6 is a schematic side view for illustrating a state in which a wiping operation is started in the recording head of FIG. 4.
Figure 7:
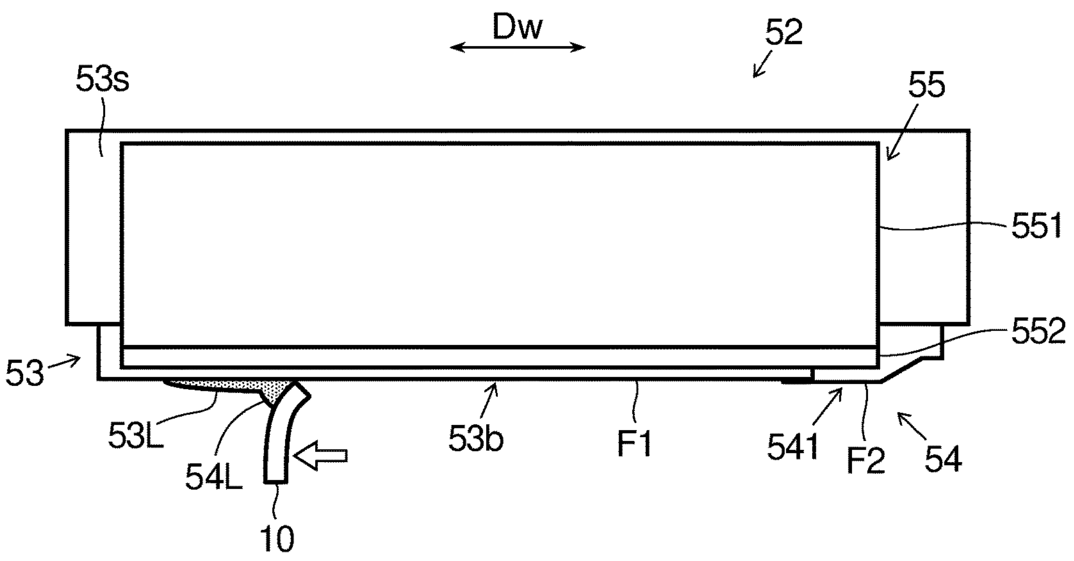
FIG. 7 is a schematic side view for illustrating a state in which the wiping operation is almost ended in the recording head of FIG. 4.

A wiping operation for the ink ejection face F1 is executed in maintenance processing of the recording head 52. In the wiping operation of this embodiment, a wiper 10 moves in the head width direction Dw, which is a wiping direction, along the ink ejection face F1. FIG. 6 is a schematic side view for illustrating a state in which the wiping operation is started in the recording head 52 of FIG. 4. FIG. 7 is a schematic side view for illustrating a state in which the wiping operation is almost ended in the recording head 52 of FIG. 4.

An ink 53L is ejected to the ink ejection face F1 from the ink ejection nozzles 531. For example, the ink 53L contains ink with increased viscosity, a foreign matter, air bubbles, and the like in the ink ejection nozzles 531, and is forcibly pushed out from the ink ejection nozzles 531. The ink 53L is held on a lower side of the ink ejection face F1 due to surface tension in a state of spreading by a predetermined length in the head width direction Dw and over the entire region of the ink ejection face F1 in the sheet conveyance direction Dc (a depth direction in the drawing sheet of FIG. 6 and FIG. 7, see FIG. 5).

A cleaning liquid 54L is supplied to the cleaning liquid supply face F2 from the cleaning liquid supply ports 541. The cleaning liquid 54L is held on a lower side of the cleaning liquid supply face F2 due to surface tension in a state of spreading by a predetermined length in the head width direction Dw and over the entire region of the cleaning liquid supply face F2 in the sheet conveyance direction Dc (the depth direction in the drawing sheet of FIG. 6 and FIG. 7, see FIG. 5).

The wiper 10 moves to a position below the cleaning liquid supply portion 54 at the time of the maintenance processing of the recording head 52. Subsequently, as illustrated in FIG. 6, the wiper 10 rises to come into contact with the cleaning liquid supply portion 54 with a predetermined pressure. Subsequently, as illustrated in FIG. 7, the wiper 10 moves in the head width direction Dw along the cleaning liquid supply face F2 and the ink ejection face F1.

The wiper 10 wipes off the cleaning liquid 54L on the cleaning liquid supply face F2, and further, carries the cleaning liquid 54L to the ink ejection face F1. In this manner, the ink that adheres on the ink ejection face F1 of the recording head 52 can easily be removed.

It is preferred that the cleaning liquid be a solution that is similar in component to ink but does not contain a color material. The cleaning liquid is a liquid composition that is formed of a solvent component and water and added with a surfactant, a preservative, a fungicide, and the like as required. The cleaning liquid is excellent in removal of ink and in ability to dissolve coagulated ink.

In the wiping operation for the ink ejection face F1, only any of the ejection of the ink 53L to the ink ejection face F1 and the supply of the cleaning liquid 54L to the cleaning liquid supply face F2 may be performed.

Returning to FIG. 3 and FIG. 4, the ink holding portions 55 are disposed on the side surfaces 53*s* of the ink ejection portion 53. The ink holding portions 55 are disposed over substantially the entire regions of the side surfaces 53*s* of the ink ejection portion 53 in a horizontal direction. More specifically, "substantially the entire regions in the horizontal direction" as mentioned here refers to ranges equivalent to horizontal ranges on the ink ejection face F1 where the ink ejection nozzles 531 are present, or ranges larger than such ranges. Each of the ink holding portions 55 includes a sheet portion 551 and a holding portion 552.

The sheet portion 551 is formed into a rectangular shape extending over substantially the entire region in the horizontal direction and the up-and-down direction of the side surface 53*s* of the ink ejection portion 53. The sheet portion 551 is formed of, for example, a polyester-made film, and is deformable by bending. The sheet portion 551 has an upper end side fixed to the side surface 53*s* of the ink ejection portion 53, for example, by a double-sided tape. A lower end side of the sheet portion 551 is a free end, and is movable in a direction of coming closer to or separating away from the side surface 53*s* of the ink ejection portion 53.

The holding portion 552 is fixed to a facing surface with respect to the ink ejection portion 53 at a lower end portion of the sheet portion 551. In other words, the holding portion 552 is located at the lower end portion of the sheet portion 551 on a side where the ink ejection portion 53 is present. The holding portion 552 and the sheet portion 551 are not required to be separate members. However, when the holding portion 552 and the sheet portion 551 are separate members, the ink holding portions 55 having characteristics described later can easily be achieved. The holding portion 552 has a length in the up-and-down direction shorter than that of the sheet portion 551. The holding portion 552 is formed into a rectangular parallelepiped shape that has a predetermined thickness in a direction of facing the side surface 53*s* of the ink ejection portion 53 and extends over substantially the entire region in the horizontal direction of the sheet portion 551.

The holding portion 552 is made of, for example, silicon, and is fixed to the lower end portion of the sheet portion 551 by a double-sided tape or the like. The holding portion 552 may be made of a fluororesin such as polytetrafluoroethylene (PTFE). The holding portion 552 is disposed so as to come into contact with or close to the side surface 53*s* of the ink ejection portion 53. This is a state in the case in which such ink as described later does not adhere to the ink ejection portion 53 or the holding portion 552. The fact that the side surface 53*s* of the ink ejection portion 53 and the holding portion 552 are close to each other corresponds to a state in which a distance between the side surface 53*s* of the ink ejection portion 53 and the holding portion 552 is 1 mm or less, preferably 0.5 mm or less, more preferably 0.3 mm or less.

For example, at the time of wiping the ink ejection face F1 of the recording head 52, ink that has risen up on the side surface 53*s* of the ink ejection portion 53 with the wiper 10 interposed therebetween enters an adjacent region between the side surface 53*s* of the ink ejection portion 53 and the holding portion 552. Accordingly, the holding portion 552 holds the ink in the adjacent region with respect to the ink ejection portion 53. In this way, the ink holding portion 55 holds the ink that has risen from the ink ejection face F1 along the side surface 53*s* of the ink ejection portion 53.

With the above-described configuration, the ink can be held by a capillary phenomenon in the adjacent region between the ink ejection portion 53 and the holding portion 552, the adjacent region being located on the side surface 53*s* of the ink ejection portion 53. Hence, it is possible to prevent the ink, which has risen up on the side surface of the recording head 52, from dropping on the sheet S due to the cleaning of the ink ejection face F1.

The ink that has entered the adjacent region between the ink ejection portion 53 and the holding portion 552 is held by the capillary phenomenon, and has high resistance against the drop. That is, even in a situation where an airflow for attracting and holding the sheet S onto the outer surface (the upper surface) of the first conveyor belt 411 below the recording head 52 flows downward, it is possible to keep holding the ink in the adjacent region between the ink ejection portion 53 and the holding portion 552 against the force caused by the airflow. Further, deformation of the sheet portion 551 causes a change in distance between the side surface 53*s* of the ink ejection portion 53 and the holding portion 552. Thus, a larger amount of the ink can be held.

The ink holding portions 55 is provided on the side surface 53*s* that extends along the wiping direction of the ink ejection portion 53. With this configuration, the ink that has risen by the wiping along the side surface 53*s* of the ink ejection portion 53 can be effectively held. Such ink holding portions 55 may be provided on side surfaces being located on an upstream end and a downstream end in the wiping direction and extending in a direction that intersects the head width direction Dw (the sheet conveyance direction Dc in this embodiment).

At least the facing surface of the holding portion 552 with respect to the ink ejection portion 53 has a water repellency higher than that of the side surface 53*s* of the ink ejection portion 53. With this configuration, it becomes easier to repel the ink, and hence the ink can be made less liable to rise above the holding portion 552.

The holding portion 552 is urged by elastic force of the sheet portion 551 in a direction of coming into contact with the side surface 53*s* of the ink ejection portion 53. Thus, the holding portion 552 is disposed at a position of coming into contact with or close to the side surface 53*s* of the ink ejection portion 53. With this configuration, the holding portion 552 can be prevented from easily separating excessively from the side surface 53*s* of the ink ejection portion 53. Thus, such a possibility can be increased that the ink that has risen up to the adjacent region between the ink ejection portion 53 and the holding portion 552 may be sucked by the capillary phenomenon. When the side surface 53*s* of the ink ejection portion 53 and the holding portion 552 are in contact with each other, it is possible to further improve this effect.

The entire holding portion 552 is not required to come into contact with the side surface 53*s* of the ink ejection portion 53, and it is only required that some portions thereof come into contact therewith in the head width direction Dw. Further, the distance between the side surface 53*s* of the ink ejection portion 53 and the holding portion 552 is 1 mm or less, preferably 0.5 mm or less, more preferably 0.3 mm or less entirely in the head width direction Dw. As a result, spots where such suction by the capillary phenomenon is less likely to occur can be reduced.

Moreover, at the time of sucking the ink, the side surface 53*s* of the ink ejection portion 53 and the holding portion 552 are less liable to excessively separate from each other, and the amount of ink held therebetween is less liable to excessively increase. Thus, it is possible to improve the effect of holding the ink so as to prevent the ink from dropping.

The holding portion 552 has a thickness of 0.5 mm or less. It is preferred that the holding portion 552 have a thickness of 0.3 mm or less. With such a small thickness of the holding portion 552, the ink that has risen up to the side surface of the recording head 52 becomes easier to enter the adjacent region between the ink ejection portion 53 and the holding portion 552, and further, is less liable to drop from a lower end of the holding portion 552.

The wiper 10 is made of an elastic material, and is deformed by coming into contact with the cleaning liquid supply portion 54 at a predetermined pressure. Further, the wiper 10 has a length in the sheet conveyance direction Dc longer than that of the ink ejection face F1. Accordingly, with the elastic deformation of the wiper 10 at the time of the wiping operation, regions of the wiper 10 on the outer side of the ink ejection face F1 in the sheet conveyance direction Dc are located above the ink ejection face F1.

Thus, each of the holding portions 552 is located above the ink ejection face F1 and apart by a predetermined distance. For example, the holding portion 552 is located above the ink ejection face F1 and apart by a distance of 0.3 mm to 2.0 mm. Further, more preferably, the holding portion 552 is located above the ink ejection face F1 and apart by a distance of 0.5 mm to 1.5 mm. With this configuration, it is possible to prevent the ink, which is placed on the wiper 10 during the wiping operation, from coming into contact with the holding portion 552. Hence, the ink placed on the wiper 10 during the wiping operation can be prevented from entering the adjacent region between the ink ejection portion 53 and the holding portion 552.

Each of the holding portions 552 is fixed so as to protrude downward beyond the lower end of the sheet portion 551 (see FIG. 3). That is, the lower end of the holding portion 552 is located below the lower end of the sheet portion 551. The lower end portion of the holding portion 552 is exposed to the outer side in the sheet conveyance direction Dc, that is, to the side opposite to the ink ejection portion 53. The surface on the side opposite to the facing surface with respect to the ink ejection portion 53 on the lower end side of the holding portion 552 has a higher water repellency than that of the side surface 53*s* of the ink ejection portion 53. Thus, even when the ink rises up to the outer side of the holding portion 552, the ink falls down rapidly, and enters the adjacent region between the ink ejection portion 53 and the holding portion 552. Hence, the ink can be made less liable to drop off the ink ejection portion 53.

Further, the water repellency on the outer side of the holding portion 552 is lower than water repellency of the ink ejection face F1. Thus, the ink that has adhered on the outer side of the holding portion 552 can be made less liable to drop onto the ink ejection face F1 in a transmission manner.

A bonding material such as the double-sided tape for use in fixing the holding portion 552 to the sheet portion 551 sometimes has low liquid resistance. Thus, the lower end portion of the sheet portion 551 is located above the lower end portion of the holding portion 552. Thus, it is possible to prevent the ink from rising to a spot of the bonding material such as a double-sided tape. Hence, the fixing strength of the holding portion 552 to the sheet portion 551 can be suitably maintained.

Moreover, the holding portion 552 protrudes beyond the sheet portion 551 toward the side surface 53*s* of the ink ejection portion 53. Thus, it is possible to improve the effect of holding the ink, which has risen up to the adjacent region between the ink ejection portion 53 and the holding portion 552, so as to prevent the ink from dropping.

Figure 8:
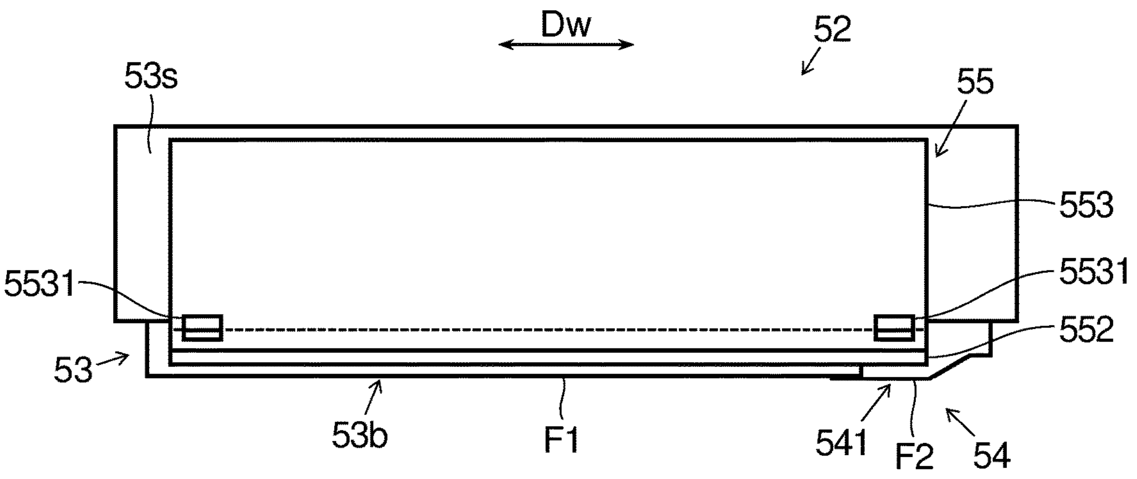
FIG. 8 is a schematic front view of a recording head of a recording unit of an inkjet recording apparatus according to a second embodiment of the present disclosure.

FIG. 8 is a schematic front view of a recording head 52 of a recording unit 5 of an inkjet recording apparatus 1 according to a second embodiment of the present disclosure. The recording head 52 according to the second embodiment includes ink holding portions 55. Each of the ink holding portions 55 includes a sheet portion 553 and a holding portion 552.

The sheet portion 553 is formed into a rectangular shape extending over substantially the entire region in a horizontal direction and an up-and-down direction of a side surface 53*s* of an ink ejection portion 53. The sheet portion 553 has an upper end side fixed to the side surface 53*s* of the ink ejection portion 53, for example, by a double-sided tape.

The sheet portion 553 has opening portions 5531. The opening portions 5531 are located in the vicinity of inner sides of a lower end edge of the sheet portion 553 and in the vicinity of inner sides of both end edges in a horizontal direction of the sheet portion 553. The opening portions 5531 are, for example, rectangular, and are open in a thickness direction of the sheet portion 553. The opening portions 5531 are open over regions of the sheet portion 553, which face the holding portion 552, and regions above an upper end of the holding portion 552. It is preferred that the opening portions 5531 be open at least above the upper end of the holding portion 552.

The sheet portion 553 has high elasticity. Particularly, the vicinity of both ends in the horizontal direction of a lower end side of the sheet portion 553, both ends being free ends, is easily deformed by bending. Thus, the ink is liable to rise above the ink ejection portion 53. For this, the opening portions 5531 are formed in the sheet portion 553 as in the above-described configuration. With this configuration, it is possible to prevent the ink from rising over the ink ejection portion 53.

Moreover, according to the above-mentioned embodiment, the inkjet recording apparatus 1 includes the recording heads 52 having the above-mentioned configuration. Accordingly, in the inkjet recording apparatus 1, it is possible to prevent the ink, which has risen up to the side surfaces of the recording head 52, from dropping onto the sheet S due to the cleaning of the ink ejection face F1.

The embodiments of the present disclosure have been described, but the scope of the present disclosure is not limited thereto. The present disclosure may be implemented by making various modifications thereto without departing from the gist of the present disclosure.

What is claimed is:

1. A recording head comprising:

an ink ejection portion including:

a bottom surface including an ink ejection face configured to eject ink onto a recording medium; and at least one side surface that connects to the bottom surface; and an ink holding portion disposed on the side surface and configured to hold ink with the side surface, wherein the ink holding portion includes:

a sheet portion formed of a material deformable by bending, the sheet portion having an upper end side fixed to the ink ejection portion and a lower end side movable in a direction of coming closer to or separating away from the side surface; and a holding portion that is located at a lower end portion of the sheet portion on the ink ejection portion side, is disposed to come into contact with or close to the side surface, and is configured to hold the ink in an adjacent region with respect to the ink ejection portion, and the holding portion is urged by an elastic force of the sheet portion in a direction of coming into contact with the side surface.

2. The recording head according to claim 1, wherein a facing surface of the holding portion with respect to the ink ejection portion has a water repellency higher than that of the side surface.

3. The recording head according to claim 1, wherein a surface on a side opposite to a facing surface with respect to the ink ejection portion on a lower end side of the holding portion has a water repellency higher than that of the side surface.

4. The recording head according to claim 1, wherein the holding portion has a thickness of 0.5 mm or less.

5. The recording head according to claim 1, wherein the holding portion is located above the ink ejection face and apart by a predetermined distance.

6. The recording head according to claim 1, wherein the holding portion protrudes beyond the sheet portion toward the side surface.

7. A recording head comprising:

an ink ejection portion including:

a bottom surface including an ink ejection face configured to elect ink onto a recording medium; and at least one side surface that connects to the bottom surface; and an ink holding portion disposed on the side surface and configured to hold ink with the side surface, wherein the ink holding portion includes:

a sheet portion having an upper end side fixed to the ink ejection portion and a lower end side movable in a direction of coming closer to or separating away from the side surface; and a holding portion that is located at a lower end portion of the sheet portion on the ink ejection portion side, is disposed to come into contact with or close to the side surface, and is configured to hold the ink in an adjacent region with respect to the ink election portion, and the sheet portion has opening portions which are located in the vicinity of inner sides of both end edges in a horizontal direction of the sheet portion, and are open at least above an upper end of the holding portion.

8. An inkjet recording apparatus comprising the recording head of claim 1.

* * * * *